(12) United States Patent
Montague et al.

(10) Patent No.: US 6,200,683 B1
(45) Date of Patent: Mar. 13, 2001

(54) COIL COATING COMPOSITIONS WITH LOW TEMPERATURE FLEXIBILITY AND IMPROVED STAIN RESISTANCE

(75) Inventors: Robert A. Montague, Allison Park; W. Scott Huffman, Kittanning; Jamel S. Richardson, Pittsburgh; Padmanabhan Sundararaman, Allison Park, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 08/357,814

(22) Filed: Dec. 16, 1994

(51) Int. Cl.$^7$ .......................... B32B 15/08; B32B 27/08; B32B 27/26; B32B 27/36
(52) U.S. Cl. .................... 428/430; 428/431; 428/436; 428/458; 428/460; 428/480; 428/481; 428/482; 428/526; 428/528; 525/398; 525/399; 525/400; 525/441; 525/443; 525/444; 525/509; 525/515; 525/519; 525/517; 528/260; 528/261; 528/263; 528/264
(58) Field of Search .................. 428/457, 458, 428/460, 481, 480, 482, 529, 430, 431, 436, 526, 528; 525/398, 399, 400, 441, 442, 443, 444, 509, 519, 515, 517; 528/230, 259, 260, 263, 264, 261

(56) References Cited

U.S. PATENT DOCUMENTS

| | | | |
|---|---|---|---|
| 3,576,775 | * 4/1971 | Jaegersberg | 260/21 |
| 3,954,899 | * 5/1976 | Chang et al. | 260/849 |
| 4,204,014 | * 5/1980 | Dorffel et al. | 427/385.5 |
| 4,206,264 | * 6/1980 | Kurr | 428/458 |
| 4,229,555 | * 10/1980 | Tobias et al. | 525/443 |
| 4,576,868 | * 3/1986 | Poth et al. | 428/423.1 |
| 4,906,727 | * 3/1990 | Fisher et al. | 528/230 |
| 5,166,288 | * 11/1992 | Kanai et al. | 525/443 |
| 5,407,995 | * 4/1995 | Hintze-Bruning et al. | 524/539 |

FOREIGN PATENT DOCUMENTS 0 257 144 * 3/1988 (EP) .
0 397 484 * 11/1990 (EP) .

OTHER PUBLICATIONS

Abstract: Derwent Publications Ltd., London, Database WPI Week 1895, GB; AN 95–137072 & JP,A,07 062 271, (Dainippon Ink & Chem Inc), Mar. 7, 1995.*

* cited by examiner

Primary Examiner—Vivian Chen
(74) Attorney, Agent, or Firm—Paul S. Chirgott; Deborah M. Altman

(57) ABSTRACT

The invention pertains to compositions which can be coated onto substrates. These compositions include a combination of a resin blend comprising a first polyester resin and a second polyester resin, wherein the first polyester is different from the second polyester, an aminoplast crosslinking resin, an acid catalyst, and a urea-aldehyde resin. Films prepared from coating compositions made in accordance with the present invention having improved stain resistance. In many instances, films prepared from coating compositions made in accordance with the present invention not only have improved stain resistance, but also have low temperature flexibility.

21 Claims, No Drawings

COIL COATING COMPOSITIONS WITH LOW TEMPERATURE FLEXIBILITY AND IMPROVED STAIN RESISTANCE

FIELD OF THE INVENTION

This invention pertains to coating compositions. Particularly, the invention pertains to compositions which can be cured to form a coating having improved stain resistant properties. More particularly, the compositions of this invention can be cured to form a coating having not only improved stain resistant properties, but also low temperature flexibility.

BACKGROUND OF THE INVENTION

It is well known in the coating industry that coil coating is a cost effective and efficient method of applying coating compositions onto a number of different substrates, particularly metals. For example, coil coating processes are often used for finishing panels employed in the fabrication of many major appliances such as refrigerators, vending machines, washers, dryers, and other metal cabinetry.

Compositions which are used to coat a metal substrate prior to the metal being formed into its desired shape must be curable to form a coating which is hard, yet flexible, in order for the pre-coated metal to withstand the various post-coating forming operations. In addition, it is often very desirable that, once cured, these types of coating compositions possess a high level of stain resistance and a high gloss (i.e., a 60° gloss value of at least 70%, preferably at least 80%, as determined by ASTM D 523-78). These features impart on the resulting coated substrate not only functionality, but also an attractive appearance to the finished article made therefrom.

In view of the many advantages associated with the implementation of pre-coated metals, those in the coatings industry are continually attempting to formulate improved compositions which can be used for these purposes. One such attempt is set out in U.S. Pat. No. 5,166,288.

That particular patent discloses that a composition, which contains a high molecular weight polyester (i.e, a number average molecular weight of 15,000 to 30,000) having a glass transition temperature of 5° to 40° C., a melamine resin which contains 60% by weight or more of hexamethoxymethylmelamine monomer, and an amine-blocked derivative of a long-chain alk-ylbenzenesulfonic acid having $C_{10}$–$C_{20}$ alkyl group, can be cured to form a coating which is hard, yet flexible, and which resists stains. However, notwithstanding the above, the coating composition disclosed therein has a number of shortcomings associated therewith.

For example, U.S. Pat. No. 5,166,288 reveals that, when the coating is formulated for processability (flexibility) at temperatures below 20° C., the cured coating's stain resistant properties decrease (see, e.g., Example 2, Table 2). This is an expected phenomena since it is known in the coatings industry that ingredients employed to give a coating low temperature flexibility typically reduce the resulting film's stain resistant properties. Accordingly, those in the coatings industry would consider a composition to be an advancement in the art if it can be cured to form a coating which has excellent stain resistant properties and low temperature flexibility (e.g., flexible at temperatures at or below about 10° C.).

Furthermore, it is also known in the coatings industry that the implementation of lower molecular weight binders facilitate the formulation of coatings with a higher solids concentration (i.e., a solids concentration which is greater than about 50 weight percent based upon the total weight of the composition). This higher solids concentration is often a very desirable feature to the end user.

In view of the above, those in the coatings industry would consider a composition to be an advancement in the art if, in addition to having a higher solids concentration, the composition can be cured to form a coating which displays excellent stain resistance and low temperature flexibility properties. It would also be considered as an advancement in the art if, in addition to having the aforementioned properties, the composition can be cured to form a film having a high gloss.

SUMMARY OF THE INVENTION

In view of the above, one object of this invention is to provide a composition which can be cured to form a film having improved stain resistant properties.

Another object of this invention is to provide a composition which can be cured to form a film having not only improved stain resistance, but also low temperature flexibility.

Yet another object of this invention is to provide a coating composition which can be cured to form a coating having not only a high gloss and improved stain resistant properties, but also low temperature flexibility.

Still another object of this invention is to provide an improved composition which is particularly adapted for use in coil coating processes.

These and other objects are achieved through the formulation of a novel coating composition which combines a polyester-based resin, a crosslinker, an acid catalyst, and a urea-aldehyde resin. The polyester-based resin can be a single polyester resin and or a blend of at least two different polyester resins.

The polyester-based resin is typically present in an amount ranging from between 50% to 95% by weight; the crosslinker is typically present in an amount ranging from between 5% to 45% by weight; the acid catalyst is typically present in an amount ranging from between 0.1% to 15.0% by weight; and, the urea-aldehyde is typically present in an amount ranging from between 0.1% to 50% by weight. These weight percentages are based upon the total weight of resin solids in the coating composition.

The compositions of the present invention can be cured to form a film having improved stain resistant properties. The compositions of the present invention can also be formulated such that cured films resulting therefrom not only have improved stain resistant properties, but also have low temperature flexibility. In addition to the aforementioned characteristics, the compositions of the present invention can further be formulated such that cured films resulting therefrom have a high gloss.

Other objects, aspects and advantages of the present invention will be apparent to those skilled in the art upon reading the specification and the appended claims which follow.

DETAILED DESCRIPTION OF THE INVENTION

In accordance with the present invention, there are provided novel compositions which can be cured to form a film having improved stain resistant properties. In a preferred embodiment of the invention, the coating composition can be cured to form coatings having improved stain resistant properties and low temperature flexibility.

As used herein, the term "low temperature flexibility" refers to a cured film's ability to flex at temperatures below about 10° C. without showing any substantial visible cracks at the point of flex, when observed under 10-power magnification.

The coating compositions of the present invention include a combination of a polyester-based resin, a crosslinker, an acid catalyst and a urea-aldehyde resin. Specifically, these coating compositions comprise a polyester-based resin which, in turn, comprises either a single polyester resin or a blend of at least two different polyester resins.

When a single polyester resin is employed in the polyester-based resin component, this polyester resin typically has a number-average molecular weight (Mn) ranging from between 3,000 to 30,000. The "number-average molecular weight" as mentioned above is measured by gel permeation chromatography (GPC) using the calibration curve of polystyrene standards. Moreover, the single polyester resin has a glass transition temperature ($T_g$) typically ranging from between −25° to 50° C. The "glass transition temperature" as mentioned herein is measured according to the differential scanning calorimetry (DSC) method.

On the other hand, when a blend of at least two different polyesters are employed in the polyester-based resin component, this blend is typically composed of at least a first polyester resin and a second polyester resin, wherein the first polyester resin typically has a number-average molecular weight (Mn), as determined by GPC, which ranges from between 3,000 to 15,000. Preferably, the molecular weight of the first polyester resin ranges from between 4,000 to 12,000; and more preferably, from between 5,000 to 10,000.

Moreover, the first polyester resin has a glass transition temperature ($T_g$) typically greater than 5° C., as measured by the DSC method. Preferably, the glass transition temperature of the first polyester resin ranges from between 10° to 50° C.; and more preferably, from between 15° C. to 25° C.

With regards to the second polyester resin, it typically has a number-average molecular weight (Mn), as determined by GPC, which ranges from between 10,000 to 30,000. Preferably, the molecular weight of the second polyester resin ranges from between 11,000 to 20,000; and more preferably, from between 12,000 to 15,000.

Moreover, the second polyester resin has a glass transition temperature ($T_g$) typically less than about 5° C., as measured by the DSC method. Preferably, the glass transition temperature of the second polyester resin ranges from between 0° to −25° C.; and more preferably, from between −5° to −15° C.

It is presently preferred to employ a blend of polyester resins in the polyester-based resin component. For example, if a blend is employed, a first polyester resin can be selected which imparts hardness to the coating, while a second polyester resin can be selected which imparts low temperature flexibility to the coating. However, notwithstanding the above, it is possible that a properly selected single polyester can impart the desired level of hardness and flexibility to the resulting coating composition.

The polyester-based resin component used when practicing this invention can be made by any suitable means known to those skilled in the art. For example, the polyester resins used in the preparation of this component can be prepared from polybasic acids and polyhydric alcohols.

Many polybasic acids and polyhydric alcohols may be used to prepare these polyester resins. However, with regards to the acids, those which are particularly useful in preparing polyesters employed when practicing this invention include, without limitation: terephthalic acid, isophthalic acid, phthalic anhydride, adipic acid, succinic acid, azelaic acid, sebacic acid, maleic acid, fumaric acid, cyclohexane dicarboxylic acids and anhydrides or esters thereof. These acids can be used alone or in any mixture to obtain the desired balance of low temperature flexibility and hardness.

With regards to those polyhydric alcohols which are particularly useful in preparing polyesters employed when practicing this invention, they include, without limitation: ethylene glycol, neopentyl glycol, substituted propane diols, substituted butane diols, substituted pentane diols, substituted hexane diols, cyclohexane dimethanol, diethylene glycol and triols (e.g., trimethylolpropane). These alcohols also can be used alone or in any mixture to obtain the desired balance of low temperature flexibility and hardness.

In accordance with the present invention, the coating composition further comprises a crosslinking resin. Typically, the crosslinker is an aminoplast resin. Examples of suitable crosslinking resins include, without limitation: benzoguanamine-formaldehyde resins and melamine-formaldehyde resins. Preferably, the crosslinker employed when practicing this invention comprises a benzoguanamine-formaldehyde resin. One specific example of a particularly useful crosslinker is the fully alkylated benzoguanamine-formaldehyde resin commercially available from Cytec Industries, Inc. under the trade name of CYMEL 1123.

When practicing this invention, the polyester-based resin component is typically present in an amount greater than 50% by weight. In many instances, the polyester-based resin component is present in an amount ranging from between 50% to 95% by weight. Preferably, the polyester-based resin component is present in an amount ranging from between 60% to 90% by weight; and more preferably, from between 70% to 85% by weight. These weight percentages are based upon the total weight of the resin solids in the coating composition.

On the other hand, the crosslinker is typically present in an amount ranging from between 5% to 45% by weight. Preferably, the crosslinker is present in an amount ranging from between 10% to 35% by weight; and more preferably, from between 15% to 25% by weight. These weight percentages are based upon the total weight of the resin solids in the coating composition.

The coating composition of the present invention also comprises a urea-aldehyde resin. Urea-aldehyde resins which are particularly useful when practicing this invention are those obtainable by reacting urea and/or urea derivatives with CH aldehydes. One example of a CH aldehyde which can be employed for this purpose is as follows:

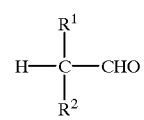

where $R^1$ and $R^2$ are each hydrocarbyl of up to 20 carbon atoms.

In one embodiment of preparing urea-aldehyde resins for use in the practice of this invention, the reaction product of urea or urea derivatives and a CH aldehyde is reacted with a mixture of formaldehyde and a CH aldehyde. Thereafter, water is removed therefrom; and, the resulting dehydrated mixture is treated with an alkali metal alcoholate.

Typically, when preparing a urea-aldehyde in accordance with the aforementioned process, in the first reaction step, the CH aldehydes are reacted with the urea and/or the urea derivatives in a molar ratio of 1:2. Moreover, this initial reaction step is typically carried out while in the presence of acids, and at a temperature ranging from between 60° to 120° C. With regards to the second reaction step, the reaction product from the first reaction step is typically reacted with a mixture of 3 moles of formaldehyde per mole of urea and 3 moles of a CH aldehyde per mole of urea. This second reaction step is also typically carried out at a temperature ranging from between 60° to 120° C. Finally, after dehydration, the reaction mixture is typically treated with an alkali metal alcoholate at a temperature ranging from between 80° to 100° C.

For example, a urea-aldehyde resin which is suitable for use when practicing this invention can be prepared by forming a urea-aldehyde condensate by reacting, in the presence of an acid and at a temperature ranging from between 60° to 120° C., 1 mole of a urea of the general formula (I)

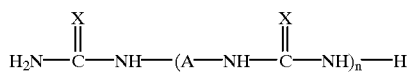

(I)

where X is oxygen or sulfur, A is $C_1$–$C_6$-alkylene, and n is from 0 to 3, with 1.9 (n+1) to 2.2 (n+1) moles of an aldehyde of the general formula (II)

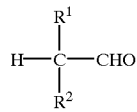

II where $R^1$ and $R^2$ are each hydrocarbyl of up to 20 carbon atoms.

The pre-condensate thus prepared is then reacted with a mixture of from 2.8 to 3.2 moles of formaldehyde and from 2.8 to 3.2 moles of aldehyde (II), each per mole of urea (I), at a temperature ranging from 600 to 120° C. Thereafter, water is removed therefrom; and, the resulting dehydrated resin is treated with an alkali metal alcoholate at a temperature ranging from 800 to 100° C.

When preparing a urea-aldehyde resin in accordance with the aforementioned procedure, suitable ureas of the general formula (I) include, without limitation: urea and thiourea (when n is 0), methylenediurea, ethylenediurea, tetramethylenediurea and hexamethylenediurea (when n is 1), and mixtures thereof. Urea is presently preferred.

Similarly, when preparing a urea-aldehyde resin in the manner set out above, suitable aldehydes of the general formula (II) include, without limitation: isobutyraldehyde, 2-methylpentanal, 2-ethylhexanal, 2-phenyl-propanal and mixtures thereof. Isobutyraldehyde is presently preferred.

The formaldehyde component used in the aforementioned process can be employed in either an aqueous form or as paraformaldehyde. Moreover, suitable acids are conventional inorganic and organic acids such as hydrochloric acid, sulfuric acid, nitric acid, oxalic acid and p-toluene sulfonic acid. Sulfuric acid is presently preferred.

The aforementioned process for making a urea-aldehyde resin suitable for use in the present invention is preferably carried out in the presence of a solvent and/or diluent. Particularly suitable solvents include, without limitation: aromatic hydrocarbons such as toluene and xylene.

One specific example of preparing a suitable urea-aldehyde component is set out in U.S. Pat. No. 4,906,727 which is incorporated herein by reference. See, e.g., column 2, line 53 through column 3, line 46 of U.S. Pat. No. 4,906,727. The presently preferred urea-aldehyde resin is that which is commercially available from BASF Corporation under the trade name of LAROPAL A-81. It is believed that BASF's LAROPAL A-81 urea-aldehyde resin is made by a process similar to that disclosed in U.S. Pat. No. 4,906,727.

When practicing the present invention, the urea-aldehyde condensate resin is typically present in an amount ranging from between 0.1 to 50 weight percent; preferably, from between 0.2 to 30 weight percent; more preferably, from between about 0.3 to about 20 weight percent; and even more preferably from between 0.5 to 10 weight percent. These weight percentages are based upon the total weight of the resin solids in the coating composition.

The coating composition of the present invention further comprises an acid catalyst. The acid catalysts which are typically employed when practicing this invention are sulfonic acid catalysts. Examples of suitable sulfonic acid catalysts include, without limitation: p-toluene sulfonic acid, naphthalene sulfonic acid derivatives, alkylbenzene sulfonic acid derivatives, alkyl sulfonic acids and the like, and/or combinations thereof.

When practicing this invention, the preferred acid catalyst will be an amine-blocked sulfonic acid. Moreover, in one particularly preferred embodiment, the catalyst comprises an amine-blocked p-toluene sulfonic acid.

The acid catalyst is typically present in an amount ranging from between 0.1 to 15.0 weight percent; preferably, from between 0.2 to 10.0 weight percent; and more preferably from between 0.5 to 7.0 weight percent. These weight percentages are based upon the total weight of the resin solids in the coating composition.

The blended resins that comprise the binder are typically dissolved in organic solvents. Any suitable solvent, or solvent mixtures, can be used for these purposes. Examples of such suitable solvents include, without limitation: aromatic hydrocarbons, ketones, esters, alcohols, glycol ethers, and the like, and/or combinations thereof. Preferably, the solvent comprises a composition selected from the following group: aromatic hydrocarbons, esters, alcohols, and/or combinations thereof.

The coating composition of the present invention typically has a solids concentration which is greater than 50 weight percent. In many instances, the coating composition has a solids concentration which ranges from between 50 to 90 weight percent. Preferably, the solids concentration in the coating composition ranges from between 50 to 80 weight percent; and more preferably, from between 55 to 75 weight percent. All of the aforementioned weight percentages are based upon the total weight of the coating composition.

The coating composition of the present invention can be blended with a number of various additives. For example, pigments may be added in order to provide color and opacity to the cured film. Moreover, additives such as ultraviolet stabilizers, flow control agents and waxes may also be added to the coating composition in order to modify the coating's durability, flow, surface frictional characteristics and/or application properties.

Coating compositions prepared in accordance with the present invention can be applied to substrates by any suitable means known to those skilled in the art. Examples of such suitable application means include, without limitation: coil coating, spraying, flow coating, spin coating, curtain coating and dip coating. Notwithstanding the above, the coating compositions of the present invention are particularly suitable for application onto substrates by coil coating techniques.

Moreover, these coating compositions can be applied onto a number of different substrates. Although these coatings can be applied directly onto the substrate's surface, a primer coating may be used to enhance corrosion resistance and adhesion.

Examples of suitable substrates onto which these novel coating compositions can be applied include, without limitation: metal, plastic, wood, glass and the like. With regards to metal substrates, this coating composition is particularly suitable for application onto electrogalvanized steels, hot-dipped galvanized steels, zinc-iron alloy steels, zinc-aluminum cladded steels, zinc-nickel cladded steels, and cold-rolled steels and aluminum.

Once the coating is applied to the desired substrate, it can be cured thermally by any suitable means known to those skilled in the art. Examples of such suitable curing techniques include, without limitation: baking in a thermal oven, induction heating, infrared heating, and the like, and/or combinations thereof.

Once cured, the coating compositions typically have a very high gloss. Specifically, the cured coating compositions prepared in accordance with this invention typically have a 60° gloss, as determined by a process similar to that described in ASTM D 523-78, which is greater than 80%. For example, in most instances, the coating compositions prepared in accordance with the present invention have a 60° gloss which ranges between 90% to 99.9%. It should be noted, however, that the gloss level of the cured coating can be decreased by the addition of additives for those instances where a high gloss coating is not desired.

In addition to having a very high gloss potential, the cured coating composition prepared in accordance with the present invention can be formulated such that it also has excellent low temperature flexibility properties. For example, in most instances, these coating compositions are flexible at temperatures below 10° C., and even at temperatures below 5° C.

In view of the above, it was very unexpected to discover that the coating compositions prepared in accordance with the present invention had excellent stain resistant properties. Specifically, as stated earlier, the prior art teaches that the stain resistant properties of a cured coating having low temperature flexibility are less than those of similar coatings which do not have low temperature flexibility.

EXAMPLES

The examples which follow are intended to assist in a further understanding of this invention. Particular materials employed, species and conditions are intended to be illustrative of the invention and do not, in any way, limit the reasonable scope thereof.

Example I

This Example demonstrates the preparation of a first and a second polyester resin which can be used in the preparation of polyester-based coating compositions.

The first polyester resin was prepared by mixing together the following monomers: neopentyl glycol (15.7 mole percent), propylene glycol (4.4 mole percent), trimethylolpropane (1.2 mole percent), dodecanedioic acid (12.7 mole percent), phthalic anhydride (23.7 mole percent), isophthalic acid (26.6 mole percent), 2-methylpropane diol (15.7 mole percent), butyl stannoic acid (0.1–0.2 mole percent), and triphenyl phosphite (0.1–0.2 mole percent). This mixture was esterified under a nitrogen atmosphere over a period of 8 to 15 hours at a temperature of 180° to 240° C. When the acid value of the mixture dropped to around 25, a small amount of Aromatic 100 solvent (i.e., an aromatic hydrocarbon solvent blend commercially available from Exxon) was incorporated for azeotropic distillation of the remaining water that evolved as a condensate by-product.

The number-average molecular weight of the resulting first polyester resin was about 7,000; its acid value was 2; its hydroxyl value was 12; and, its glass transition temperature was about 20° C. The first polyester resin's number-average molecular weight was measured by GPC using the calibration curve of polystyrene standards. Moreover, this resin's glass transition temperature was measured according to the DSC method.

The first polyester resin was thereafter dissolved in a solvent blend of 75/25 Aromatic 100 solvent/Dowanol PM acetate to produce a composition which was about 60% weight solids. Dowanol PM is a trade name of 1-methoxy-2-propanol commercially available from Dow Chemical Co. Hereinafter, this resin composition is referred to as Polyester A.

The second polyester resin was prepared in the same manner as Polyester A, except that, in the preparation of the second polyester resin, the following monomers were mixed together: adipic acid (31.0 mole percent), neopentyl glycol (12.6 mole percent), ethylene glycol (10.5 mole percent), isophthalic acid (33.0 mole percent), 2-methyl propane diol (12.5 mole percent), butyl stannoic acid (0.1–0.2 mole percent), and triphenyl phosphite (0.1–0.2 mole percent).

The number-average molecular weight of the resulting second polyester resin was about 12,000; its acid value was slightly less then 3; its hydroxyl value was 8; and, its glass transition temperature was about −7° C. The second polyester resin's number-average molecular weight was measured by GPC using the calibration curve of polystyrene standards. Moreover, this resin's glass transition temperature was measured according to the DSC method.

The second polyester resin was thereafter dissolved in a solvent blend of 75/25 Aromatic 150 solvent/Dowanol PM acetate to produce a composition which was about 60% weight solids. Aromatic 150 solvent is an aromatic hydrocarbon solvent blend commercially available from Exxon. Hereinafter, this resin composition is referred to as Polyester B.

Example II

This Example demonstrates the preparation and testing of coating compositions using the polyesters prepared in Example I.

The first coating composition which was prepared was one encompassed by the present invention. In the preparation of this particular coating composition, 36.0 weight percent of Polyester A and 33.0 weight percent of Polyester B from Example I were combined with 20.0 weight percent of CYMEL 1123 (a benzoguanamine-formaldehyde resin commercially available from Cytec Industries), 5.0 weight percent of LAROPAL A-81 (a urea-aldehyde condensate resin commercially available from BASF), and 1.2 weight percent of NACURE 2500 (an amine-blocked p-toluene sulfonic acid catalyst commercially available from King Industries). These weight percentages were based upon the total weight in grams of the resin solids in the coating composition.

After these components were combined together, the blend was diluted with a blend of Aromatic 150 (50 grams), Aromatic 100 (18 grams), isopropanol (1.6 grams), Dowanol PM acetate (14.4 grams), and n-butanol (11.0 grams). To this diluted mixture, 79 grams of titanium dioxide (pigment) and 4.8 grams of UV stabilizers and flow control agents were added to produce a coating composition. Hereinafter, this coating composition is referred to as Coating A. The total solids concentration of Coating A was about 65 weight percent.

Coating A was applied, with a wet film wire-wound rod applicator, to pre-primed electrogalvanized steel panels at a dry film thickness of 17–25 microns. The thickness of the steel panels was 0.024 inches; and, the amount of the galvanized coating was about 20 g/m$^2$. Thereafter, the film was cured at 230° C. peak metal temperature in a gas-fired convection oven for about 30 to 40 seconds.

When testing the properties of the cured film, it was observed that its 60° gloss (as determined by a process similar to that described in ASTM D 523-78) was very near to 100%. Moreover, it was also observed that the film's stain resistant properties were characterized as being excellent.

For this Example, the film's stain resistant properties were determined by the following procedure. First, marker ink stripes were applied to the surface of the cured film and allowed to dry at ambient temperature for a period of at least 24 hours. The ink used for this test came from red and black MAGIC INK markers (a brand of felt-tipped ink markers commercially available from the Magic Ink Co. of Japan).

After the ink had dried, the coated steel panel was washed with an ethanol-soaked cheesecloth using mild pressure for approximately 5 to 10 seconds. The level of removal of the ink from the cured film was determined by a visual evaluation. As stated above, the stain resistant properties of the cured film resulting from Coating A was characterized as excellent. This was characterized as such since virtually all of the red and black ink stains were removed.

The cured film resulting from Coating A was also tested for its low temperature flexibility. In this Example, low temperature flexibility was determined by bending the coated steel panel 180° while the panel was maintained at a temperature of about 0° C. Thereafter, the panel was observed with a 30-power magnification loupe to determine whether there were any visible cracks in the coating.

When performing this low temperature flexibility test, two sheets of the same plate were inserted in the inner radius of the bend (2T) in a manner similar to that illustrated on page 835 of ASTM D 3794-79. It was observed that, when lo the cured film resulting from Coating A was subjected to this low temperature flexibility test, there were no visible cracks in the film under a 30-power magnification.

In order to demonstrate the superiority and/or non-obviousness of coating compositions prepared in accordance with this invention, a first control coating was also prepared and tested. The first control coating was prepared by using the same exact components and process steps as set out above for the preparation of Coating A, except that, when preparing the first control coating, there was no urea-aldehyde resin added to the reaction mixture. Hereinafter, this first control coating composition is referred to as Coating B.

When testing the properties of a cured film resulting from Coating B, it was observed that it had a gloss level and a low temperature flexibility which was similar to that of Coating A. Specifically, it was observed that the cured film resulting from Coating B had a 60° gloss which was very near to 100%. Moreover, it was also observed that this cured film had low temperature flexibility (i.e., there were no visible cracks in the film under a 30-power magnification after being subjected to the aforementioned low temperature flexibility test).

Notwithstanding the above, the stain resistant properties of the film resulting from Coating B were inferior to those of the film resulting from Coating A. Specifically, while Coating A's film had excellent stain resistant properties, the stain resistant properties of Coating B's film were characterized merely fair.

In order to further demonstrate the superiority and/or non-obviousness of coating compositions prepared in accordance with this invention, a second control coating composition was prepared and tested. The second control coating composition was prepared by using the same exact components and process steps as set out above for the preparation of Coating A, except that, when preparing the second control coating composition, the urea-aldehyde resin was replaced with BEETLE® 80 (a urea formaldehyde resin commercially available from Cytec Industries). Moreover, this second control coating composition did not contain the UV stabilizers or flow control agents as in the other coatings. These omitted additives were found to have no benefecial effect on a coating's stain resistant properties. Hereinafter, this second control coating composition is referred to as Coating C.

When testing the properties of a cured film resulting from Coating C, it was observed that it had a gloss level which was similar to that of Coating A and Coating B. Specifically, it was observed that the cured film resulting from Coating C had a 60° gloss which was very near to 100%.

However, as with Coating B, the stain resistant properties of the film resulting from Coating C were also inferior to those of the film resulting from Coating A. Specifically, while Coating A's film had excellent stain resistant properties, the stain resistant properties of Coating C's film were also characterized as merely fair. The aforementioned observations are set out in the following Table.

| | COMPARISON OF STAIN RESISTANT PROPERTIES | | |
|---|---|---|---|
| | Coating Composition | | |
| Coating Test | A (invention) | B (control) | C (control) |
| Luster[1] | 99.3% | 99.4% | 99.3% |
| Processibility[2] | pass | pass | -- not tested -- |
| Stain Resistance[3] | ○ | ● | ● |

[1]This refers to the 60° gloss of a cured film as determined by the process set out in this Example.
[2]This refers to the low temperature flexibility of a cured film as determined by the process set out in this Example. A classification of "pass" means that there were no visible cracks observed.
[3]This refers to the stain resistance of a cured film as determined by the process set out in this Example. A classification of "○" means excellent; a classification of "◉" means good; and a classification of "●" means fair.

As can be seen from the above, the only coating composition which was curable to a high gloss coating having not only low temperature flexibility but also excellent stain resistant properties was that encompassed by the present invention (i.e., Coating A).

It is evident from the foregoing that various modifications, which are apparent to those skilled in the art, can be made to the embodiments of this invention without departing from the spirit or scope thereof. Having thus described the invention, it is claimed as follows.

That which is claimed is:

1. A stain resistant coating composition comprising:
   (a) a resin blend, wherein said resin blend comprises a first polyester resin and a second polyester resin, and wherein said first polyester is different from said second polyester,
   (b) an aminoplast crosslinking resin,
   (c) an acid catalyst, and
   (d) a urea-aldehyde condensate resin.

2. A coating composition as recited in claim 1 wherein the first polyester has a number-average molecular weight ranging from between 3,000 to 15,000, and wherein the first polyester resin has a glass transition temperature which is greater than 5° C.

3. A coating composition as recited in claim 1 wherein the second polyester has a number-average molecular weight ranging from between 10,000 to 30,000, and wherein the second polyester resin has a glass transition temperature which is less than 5° C.

4. A coating composition as recited in claim 1 wherein the aminoplast crosslinker comprises a resin selected from the group consisting of benzoguanamine-formaldehyde resins and melamine-formaldehyde resins.

5. A coating composition as recited in claim 1 wherein the resin blend is present in an amount ranging from between 50 to 95 weight percent, and wherein the crosslinker is present in an amount ranging from between 5 to 40 weight percent, said weight percentages being based upon the total weight of resin solids in the coating composition.

6. A coating composition as recited in claim 1 wherein the urea-aldehyde condensate comprises a urea-aldehyde polycondensate made from reacting urea or urea derivatives with an aldehyde of the formula:

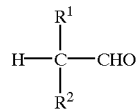

where $R^1$ and $R^2$ are each a hydrocarbyl having from 1 to 20 carbon atoms.

7. A coating composition as recited in claim 1 wherein the urea-aldehyde condensate comprises a urea-aldehyde polycondensate made from a process comprising the following steps:
   (a) reacting at from 60° to 120° C., in the presence of an acid, 1 mole of a urea of the formula (I)

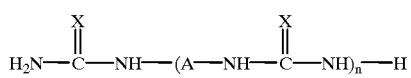

where X is oxygen or sulfur, A is $C_1$–$C_6$-alkylene, and n is from 0 to 3, with 1.9 (n+1) to 2.2 (n+1) moles of an aldehyde of the formula (II)

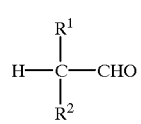

where $R^1$ and $R^2$ are each a hydrocarbyl having from 1 to 20 carbon atoms, (b) reacting at from 600 to 120° C. the product of step (a) with a mixture of from 2.8 to 3.2 moles of formaldehyde and from 2.8 to 3.2 moles of aldehyde (II), each per mole of urea (I),
   (c) removing any water from the product of step (b), and
   (d) reacting at from 800 to 100° C. the product from step (c) with an alkali metal alcoholate.

8. A coating composition as recited in claim 7 wherein the formula (I) is a composition selected from the group consisting of: urea and thiourea when n is 0, methylenediurea, ethylenediurea, tetramethylenediurea and hexamethylenediurea when n is 1, and mixtures thereof.

9. A coating composition as recited in claim 1 wherein the urea-aldehyde is present in an amount ranging from between 0.1 to 50 weight percent, said weight percentages being based upon the total weight of resin solids in the coating composition.

10. A coating composition as recited in claim 1 wherein the acid catalyst comprises a sulfonic acid catalyst.

11. A coating composition as recited in claim 10 wherein the sulfonic acid catalyst comprises an acid selected from the group consisting of: p-toluene sulfonic acid, naphthalene sulfonic acid derivatives, alkylbenzene sulfonic acid derivatives, and alkyl sulfonic acids.

12. A coating composition as recited in claim 1 wherein the acid catalyst comprises an amine-blocked catalyst.

13. A coating composition as recited in claim 1 wherein the acid catalyst is present in an amount ranging from between 0.1 to 15.0 weight percent, said weight percentages being based upon the total weight of resin solids in the coating composition.

14. A coating composition as recited in claim 1 wherein the total solids concentration in said coating composition is greater than about 50 weight percent.

15. A stain resistant coating composition comprising:
   (a) a resin blend present in an amount ranging from between 50 to 95 weight percent, said resin blend comprises
      (i) a first polyester resin having a number-average molecular weight ranging from between 3,000 to 15,000 and a glass transition temperature greater than 5° C., and
      (ii) a second polyester resin having a number-average molecular weight ranging from between 10,000 to 30,000 and a glass transition temperature less than 5° C.,
   (b) an aminoplast crosslinking resin present in an amount ranging from between 5 to 40 weight percent,
   (c) an acid catalyst present in an amount ranging from between 0.1 to 15.0 weight percent, and
   (d) a urea-aldehyde resin present in an amount ranging from between 0.1 to 50 weight percent,
wherein the weight percentages are based upon the total weight of resin solids in the coating composition.

16. A substrate coated with a cured stain resistant coating composition, said coating composition comprising:
   (a) a resin blend, wherein said resin blend comprises a first polyester resin and a second polyester resin, and wherein said first polyester is different from said second polyester,
   (b) an aminoplast crosslinking resin,
   (c) an acid catalyst, and
   (d) a urea-aldehyde condensate resin.

17. A coated substrate as recited in claim 16 wherein the substrate comprises at least one material selected from the group consisting of: metal, plastic, wood and glass.

18. A coated substrate as recited in claim 16 wherein the substrate comprises at least one material selected from the group consisting of: electrogalvanized steel, hot-dipped galvanized steel, zinc-iron alloy steels, zinc-aluminum cladded steels, zinc-nickel cladded steels, and cold-rolled steels and aluminum.

19. A coated substrate as recited in claim 16 wherein the cured coating composition has a 60° gloss which is greater than 80% as determined by ASTM D 523-78.

20. A coated substrate as recited in claim 16 wherein at least part of the coating composition was applied by a coil coating process.

21. A substrate coated with a cured, stain resistant coating composition, said coating composition comprising:
(a) a resin blend present in an amount ranging from between 50 to 95 weight percent, said resin blend comprises
 (i) a first polyester resin having a number-average molecular weight ranging from between 3,000 to 15,000 and a glass transition temperature greater than 5° C., and
 (ii) a second polyester resin having a number-average molecular weight ranging from between 10,000 to 30,000 and a glass transition temperature less than 5° C.,
(b) an aminoplast crosslinking resin present in an amount ranging from between 5 to 40 weight percent,
(c) a acid catalyst present in an amount ranging from between 0.1 to 15.0 weight percent, and
(d) a urea-aldehyde resin present in an amount ranging from between 0.1 to 50 weight percent, wherein the weight percentages are based upon the total weight of resin solids in the coating composition.

\* \* \* \* \*

UNITED STATES PATENT AND TRADEMARK OFFICE
CERTIFICATE OF CORRECTION

PATENT NO.   : 6,200,683 B1
DATED        : March 13, 2001
INVENTOR(S)  : Montague et al.

It is certified that error appears in the above-identified patent and that said Letters Patent is hereby corrected as shown below:

Column 12,
Line 1, delete "600" and replace it with -- 60º --; and
Line 6, delete "800" and replace it with -- 80º --.

Signed and Sealed this

Fourth Day of June, 2002

*Attest:*

*Attesting Officer*

JAMES E. ROGAN
*Director of the United States Patent and Trademark Office*